GILL & TILLINGHAST.
Churn.

No. 6,538.

Patented June 19, 1849.

UNITED STATES PATENT OFFICE.

G. E. GILL AND J. B. TILLINGHAST, OF CHILLICOTHE, OHIO.

CHURN.

Specification of Letters Patent No. 6,538, dated June 19, 1849.

*To all whom it may concern:*

Be it known that we, GEORGE E. GILL and JOSEPH B. TILLINGHAST, of the town of Chillicothe, in the county of Ross and State of Ohio, have invented certain new and useful Improvements in Lewis and Johnson's Atmospheric Churn for the Purpose of Making Butter, of which the following is a full, clear, and exact description, reference being had to the annexed drawings of the same, making part of this specification, of which—

Figure 1:
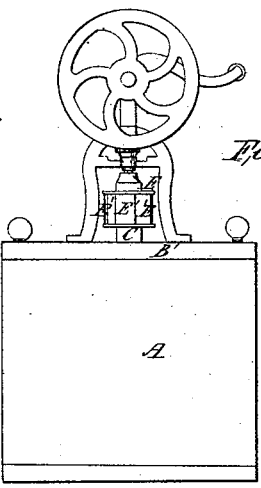
Figure 2:
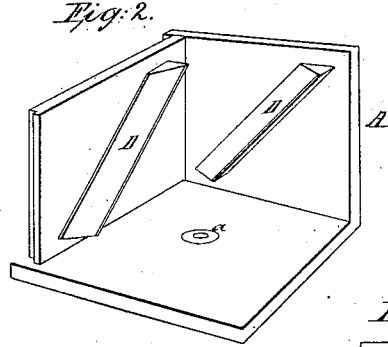
Figure 3:
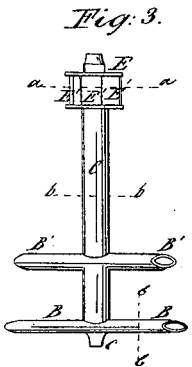
Figure 7:
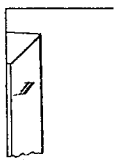
Figure 4:
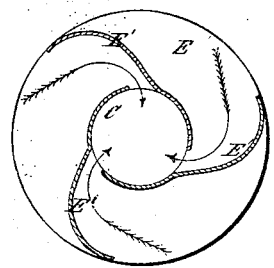
Figure 5:
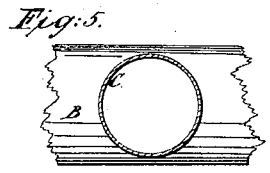
Figure 6:
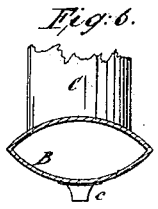

Figure 1 is a front elevation of the churn, Fig. 2, represents two of the interior and adjoining sides of the churn box, Fig. 3 represents the front view of the dasher, Fig. 4, horizontal section of Fig. 3 at the line $a$ $a$, Fig. 5 a cross section of the vertical shaft of the dashers at $b$ $b$, Fig. 6 a cross section of the horizontal dasher at the line C, C, Fig. 7, represents a cross section of the double inclined stops D D, Fig. 2.

The nature of our invention and improvement consists in a new combination and arrangements of known mechanical devices, whereby cream is churned by mixing a sufficient stream of atmospheric air with it at the same time, that it is subject to a high degree of agitation by a revolving dasher in the usual way.

To enable others skilled in the art, to make and use our invention we will proceed to describe its construction and operation.

The churn may be made of any convenient form and of any suitable materials, the churn or body A of the vessel to contain the cream has a step $a$ in the center of the bottom, (the churn had better be of a cubical form) on each side there are fastened one or more double inclined stops D as seen in Fig. 2. These stops are made of a piece of timber dressed to a right angle triangle shape and long enough to reach diagonally across each side of the churn as seen in Fig. 2, D, D, and placed with the right angle down as seen at Fig. 7. The depressed ends of the stops shall terminate at the left hand bottom corner, when the dashers B are geared to revolve from right to left. The great advantages of these double inclined stops to the churn are, that in the process of churning they serve to hold the cream and affect a reaction, and thus offering a greater resistance to the revolving dashers, thereby making the beating operation more perfect, 2d that in the process of gathering the butter after churning, the dashers B are turned backward, this produces a rapid rotary motion of the cream which drives it up the double inclined stops. The second inclination throws it off to the center, collecting the butter in a mass around the vertical shaft, C.

The dashers B' B, C, is constructed of three hollow tubes B' B, C, a gudgeon $c$ at the bottom and an air wheel E at the top, corresponding in appearance to that of a water wheel, with this difference, that the openings in the vertical shaft permits the air taken up by the buckets E' to pass in and down the shaft, C the vertical shaft C is round and revolves in a movable lid B' just below the air wheel, E the horizontal tubes B' B are of an elliptical form, the upper or additional horizontal dashers B' are perforated with a hole through which the vertical shaft C passes, there must be holes in the vertical shaft to correspond to the interior of the horizontal dasher, the bottom horizontal dasher B has a hole in the upper side of it to match the lower end of the vertical shaft and is made fast to it, the gudgeon is placed on the bottom of the dasher so as to correspond with the center of the vertical shaft, the ends of the horizontal dashers are cut off obliquely at each end and parallel to each other, and in churning they must revolve so that the long point of the dasher shall go front.

The entire failure to churn a large quantity of cream in the original churn obliged us to make some improvement on it and by the addition of our improvement a large quantity can be churned with nearly the same facility thereby making the churn as now improved one of the best in the country.

We disclaim all right to the original invention of the churn.

What we claim as our improvement and desire to secure by Letters Patent is—

The introduction of the double inclined stops as above described.

GEORGE E. GILL.
J. B. TILLINGHAST.

Witnesses:
DAVID OTT,
LEWIS HEISER.